(12) United States Patent
Kindaichi

(10) Patent No.: US 7,164,438 B2
(45) Date of Patent: Jan. 16, 2007

(54) ELECTRONIC PICKUP CAMERA AND CONTROL METHOD OF ELECTRONIC PICKUP CAMERA

(75) Inventor: Takeshi Kindaichi, Hachiouji (JP)

(73) Assignee: Olympus Corporation, Tokyo (JP)

(*) Notice: Subject to any disclaimer, the term of this patent is extended or adjusted under 35 U.S.C. 154(b) by 918 days.

(21) Appl. No.: 10/191,920

(22) Filed: Jul. 9, 2002

(65) Prior Publication Data

US 2003/0012566 A1 Jan. 16, 2003

(30) Foreign Application Priority Data

Jul. 10, 2001 (JP) .............................. 2001-209781

(51) Int. Cl.
*H04N 5/225* (2006.01)
(52) U.S. Cl. .................................. 348/207.1
(58) Field of Classification Search ..............
348/211.99–211.4, 231.4, 207.1
See application file for complete search history.

(56) References Cited

U.S. PATENT DOCUMENTS

2001/0020977 A1* 9/2001 Watanabe ................... 348/222
2003/0011680 A1* 1/2003 Tanaka et al. ............ 348/207.1

FOREIGN PATENT DOCUMENTS

JP 11-136612 5/1999
JP 2000-156813 6/2000

* cited by examiner

*Primary Examiner*—Vivek Srivastava
*Assistant Examiner*—Timothy J. Henn
(74) *Attorney, Agent, or Firm*—John C. Pokotylo; Straub & Pokotylo

(57) ABSTRACT

An electronic pickup camera including an electronic pickup element which photoelectrically converts an object image to form an image signal, an image conversion unit which converts the image signal formed by the electronic pickup element to image data of a predetermined format, a storage unit which stores the image data converted by the image conversion unit, a transmission unit which enables transmission of the image data stored in the storage unit to an external device, and a control unit which makes a decision as to whether an external device to which the transmission unit transmits the image data is a predetermined external device, and selects an accompanying process for the transmission, on the basis of a result of the decision. One embodiment of the invention relates to the deletion of the transmitted image data. For example, it is possible to provide an electronic camera which determines whether a device to which image data is transmitted is an operator's PC, and automatically deletes transmitted data only when the electronic camera determines that the device is the operator's PC.

23 Claims, 5 Drawing Sheets

ELECTRONIC PICKUP CAMERA AND CONTROL METHOD OF ELECTRONIC PICKUP CAMERA

CROSS-REFERENCE TO RELATED APPLICATION

The present application is based upon and claims the benefit of priority from the prior Japanese Patent Application 2001-209781, filed Jul. 10, 2001, and the entire contents of the application are incorporated herein by reference.

BACKGROUND OF THE INVENTION

1. Field of the Invention

The present invention relates to an electronic pickup camera capable of wireless transmission of picked-up image data to an external storage device, and to a control method thereof.

2. Description of the Related Art

A conventional electronic pickup camera converts an image signal, picked up by an electronic pickup element, into compressed data and stores the compressed data in a semiconductor storage medium provided in the camera. A semiconductor storage element is a popular storage medium for such an electronic pickup camera. In some cases, the semiconductor storage element is fixedly mounted in the camera, and in other cases it is detachably mounted in the camera. The capacity of the semiconductor storage element to store image data is generally limited, thus the element cannot store a large quantity of image data.

Since Semiconductor storage elements are expensive, it is popular practice to transmit image data temporarily stored in a semiconductor storage element to an external storage device and store the image data therein, instead of preparing a plurality of semiconductor storage elements to store a large amount of the picked-up image data in these semiconductor storage elements. Examples of the external storage device include personal computers (hereinafter referred to as PC(s)) and PDAs (personal digital assistants). The term "external storage device" used herein indicates an external device capable of storing transmitted image data.

When image data stored in a semiconductor storage element of an electronic pickup camera is ready to be transmitted to an external storage device, the electronic pickup camera and the external storage device are usually connected with a connecting cable for data transmission. Then, the electronic pickup camera is driven and controlled from the external storage device, and the image data stored in the semiconductor storage element is read out, transmitted and stored in a storage medium in the external storage device.

During the transmission of the image data, the electronic pickup camera and the external storage device need to be located within a length of the connecting cable for data transmission. Therefore, when the electronic pickup camera is used at a location remote from the external storage device, the electronic pickup camera needs to be brought into the range where it can be connected to the external storage device with the connecting cable for data transmission. Consequently, a method for transmitting image data picked up by an electronic pickup camera to an external storage device by using a telephone line (including a cellular telephone line) has been thought out.

In this manner, image data picked up by an electronic pickup camera has typically been transmitted to an external storage device via a telephone line (including a cellular telephone line) and stored in the external storage device.

When an operator of the electronic pickup camera determines that the image data transmitted to the external storage device no longer needs to be stored in the storage medium within the electronic pickup camera, the operator manually deletes the transmitted image data from the storage medium of the electronic pickup camera.

On the other hand, the image data picked up by the electronic pickup camera may be transmitted to an external device which does not have an image data recording capability (or which only has a storage capability insufficient to record image data stored in the semiconductor storage element in the camera). A cellular telephone and a printer are examples of external devices having no or little capacity to store image data.

BRIEF SUMMARY OF THE INVENTION

In many cases, when image data stored in a recording medium of an electronic pickup camera are transmitted to an external device, various accompanying processes are performed in addition to the transmission. One example of these accompanying processes is deleting transmitted image data from the recording medium of the electronic pickup camera.

However, after the image data stored in the storage medium of the electronic pickup camera has been transmitted to the external device, there are some cases in which it is appropriate to delete the image data from the storage medium, and there are other cases in which it is inappropriate to delete the image data from the storage medium. The decision of whether or not to delete the image data depends on the external device.

An example of a case where it is appropriate to delete the image data from the storage medium is when an operator of the electronic pickup camera transmits the image data to a PC installed in the operator's house or in his/her office and records the image data on a recording medium in the PC. In this case, since the transmitted image is recorded in the PC, which can be operated by the operator, there is normally no problem deleting the transmitted image data from the storage medium of the electronic pickup camera. Moreover, it is rational to delete the transmitted image data from the camera to increase the storage capacity of the storage medium of the camera.

An example of a case where it is inappropriate to delete the image data from the storage medium is when the operator of the electronic pickup camera transmits image data to a PC which the operator cannot freely operate (for example, the external device is PC that belongs to another person). In this case, if the operator deletes the transmitted data from the storage medium in his/her electronic pickup camera, he or she faces serious problems when trying to recover the transmitted data. Accordingly, deleting transmitted image data from the storage medium of the electronic pickup camera, in many cases, results in the loss of the precious image data. In addition, if an external device, to which the image data are transmitted, does not have the capability to store image data, or has insufficient capacity, it is inappropriate to delete transmitted image data from the storage medium of the electronic pickup camera, since the deleted image data may not have been stored in the storage medium in the external device.

When the image data stored in the storage medium of the electronic pickup camera is to be deleted after transmission, the operator of the electronic pickup camera manually performs the deletion of the image data based on his/her judgement. However, there is a risk that the operator may inadvertently delete desired image data as a result of a mistaken operation. In addition, the operator may feel uneasy about deleting image data.

The invention has been made in view of the above-described problems, and relates to processes accompanying the processing of transmitting image data to an external device from a storage medium of an electronic pickup camera. A preferred example of such accompanying processes is a process relating to the deletion of transmitted image data from the storage medium in the camera. The process relating to the deletion of image data includes deleting image data from the storage medium in the camera, displaying a message like "Image data may (or may not) be deleted", and setting an undeletable (or deletable) attribute to the image data.

However, the accompanying processes to which the invention is directed are not limited to the processes relating to the deletion of transmitted image data from the storage medium. For example, a process of sending an e-mail performed as an accompanying process of transmission of image data from the image pick up camera to a friend's cellular phone, and a process of sending report data performed as an accompanying process of transmission of image data to a PC in the operator's office, are within the scope of the invention. Of course, such accompanying processes include not only processes to be executed after the transmissions, but also include processes to be executed before or during the transmissions. An example of the processes to be executed before the transmission is the process of modifying image data according to the environment of the external device (such as, conversion of data format). An example of the processes to be executed during the transmission is recording the transmission logs in real time.

The invention provides a construction which, when image data stored in a storage medium of an electronic pickup camera are to be transmitted to an external device, determines whether the external device is a predetermined external device or not, and selects an appropriate accompanying process of the transmission according to the result of the decision. Accordingly, the invention makes it possible to select an appropriate accompanying process of the transmission process, according to the external device to which the image data are transmitted.

Two examples of a predetermined external device are explained below.

The first example of a predetermined external device is an external device registered in the electronic pickup camera. The operator of the electronic pickup camera may register PCs installed in the operator's house or his/her office, in the electronic pickup camera.

The second example of a predetermined external device is an external device capable of providing a predetermined service. Specifically, whether the external device to which the image data are transmitted is a predetermined external device or not is decided based on the service that the external device provides. A predetermined service is, for example, a service of storing the transmitted image data in the external device or a service of delivering the transmitted image data to a plurality of PCs including a PC installed in the operator's house. In this example of a predetermined service, a printer having no image recording function is not regarded as having a predetermined service, thereby is not regarded as a predetermined external device.

Two examples of an accompanying process selected when the external device is a predetermined device, and two preferred examples for an accompanying process selected when the external device is not a predetermined device, are explained below.

The first example of an accompanying process selected when the external device is a predetermined external device is deleting the transmitted image data from the storage medium of the electronic pickup camera. In this example, since the electronic pickup camera automatically deletes the image data, the operation of the electronic pickup camera becomes easy. Of course, if the transmission of image data fails, the image data should not be deleted from the storage medium of the electronic pickup camera.

The second example of an accompanying process selected when the external device is a predetermined external device is displaying a message to inform that the transmitted image data may (or should) be deleted from the storage medium. In this case, suggesting image data deletion to the operator may elevate any uneasiness in deleting the image data.

The first example of an accompanying process selected when the external device is not a predetermined external device is setting an undeletable attribute to the image data stored in the storage medium. In this case, the operator is prevented from erroneously deleting the image data that should not be deleted.

The second example of an accompanying processes selected when the external device is not a predetermined external device is displaying a message to inform the operator that the transmitted image data may (or should) not be deleted from the storage medium of the electronic pickup camera. In this case, displaying a warning message to the operator reduces the possibility that the operator might erroneously delete image data that should or may not be deleted.

There are a plurality of methods for identifying an external device and searching for a service which can be provided by the external device. A person who implements the invention may appropriately select an available method according to the type of the transmission.

For example, in the case where the transmission is wireless transmission based on Bluetooth standards, the remote external device can be identified with a link key. The link key is a key used for mutual authentication in wireless communication based on Bluetooth standards. Bluetooth devices that are newly connected together generate a common 128-bit key called a link key, and share the link key for authenticating each other. In subsequent communications, both Bluetooth devices authenticate each other on the basis of the fact that the remote device at the other end has the same link key. By using this link key, it is possible to easily identify a device to which the image data are transmitted. In addition, a Bluetooth address may also be used instead of the link key.

In the case where transmission is wireless transmission based on Bluetooth standards, it is possible to search for a service which can be provided by the external device to which the image data are transmitted, by using the SDP (Service Discovery Protocol). The SDP is a protocol for searching for services provided by a remote device.

In the case of transmission which is based on LAN communication, an address called "MAC address", which is unique to each device, is contained in the header of a packet, whereby it is possible to identify a remote-side external device by using its MAC address.

The electronic pickup camera according to the invention is not limited to a camera-dedicated device. The invention is directed to all kinds of electronic devices having electronic image pickup functions (including cellular telephones, PDAS, watches, notebook personal computers). Examples of storage media which can be adopted in the electronic pickup camera are semiconductor storage elements, HDDs, MOs, CD-RWs, DVD-ROMS, DVD-RWs, etc. Any of these storage media may be built in or detachably attached to the electronic pickup camera.

External devices of the invention encompasses external devices (external storage device) having the capability to store image data and an external device having no capability to store image data. For example, PCs, PDAs, printers, cellular telephones, data servers and display devices are examples of external devices that may be used with the present invention.

DETAILED DESCRIPTION OF THE INVENTION

Figure 1:
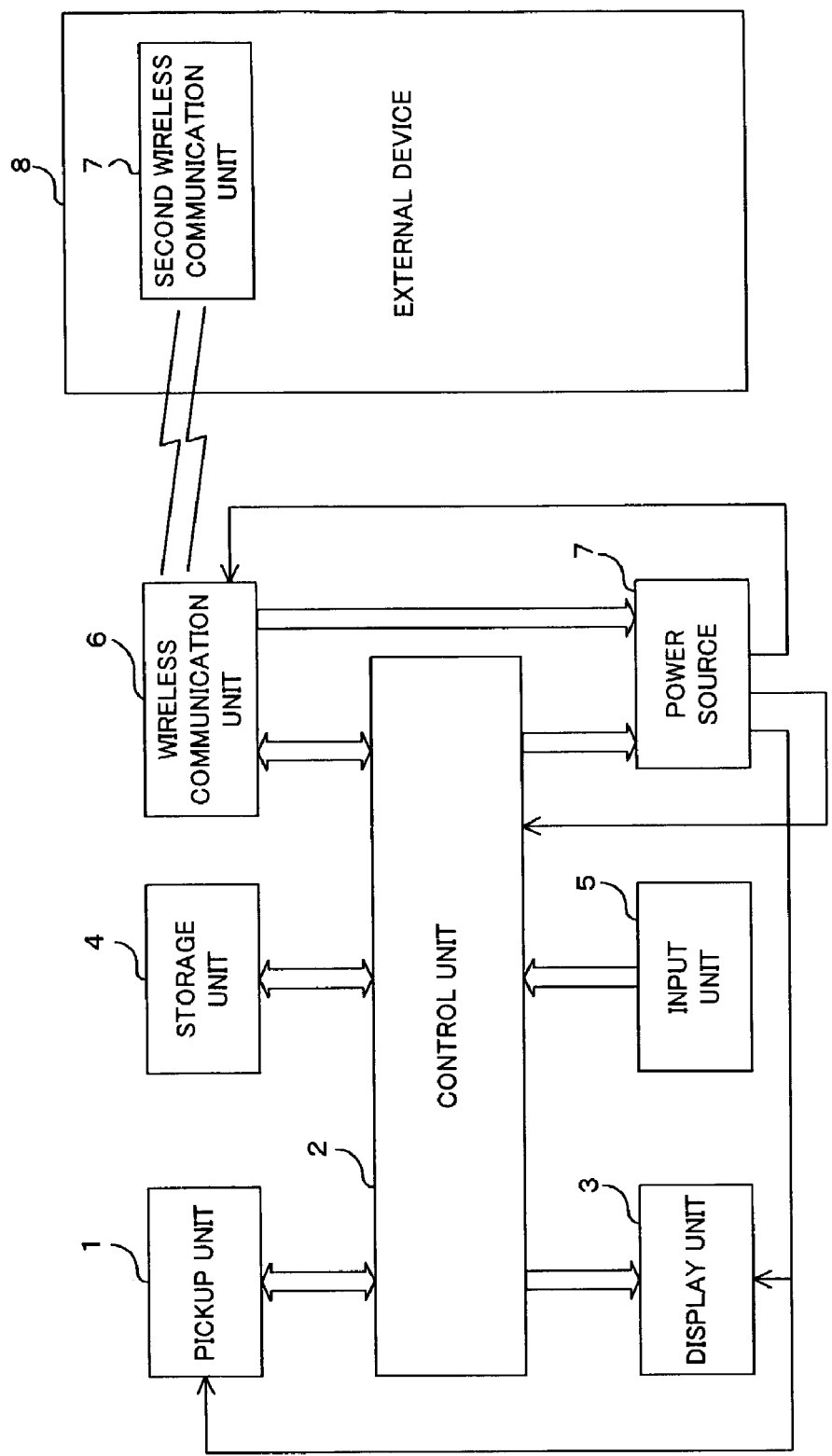
FIG. 1 is a block diagram showing the construction of an electronic pickup camera in an embodiment of an electronic pickup camera according to the invention.

An embodiment of the invention will be described below in detail with reference to the accompanying drawings. FIG. 1 is a block diagram showing the construction of an electronic pickup camera of this embodiment.

As shown in FIG. 1, the electronic pickup camera of this embodiment includes a pickup unit 1, a display unit 3, a storage unit 4, an input unit 5, a wireless communication unit 6 and a power source 7 coupled to a control unit 2. The pickup unit 1 has an electronic pickup element which photoelectrically converts an object image to form an image signal, and an electronic conversion unit which converts the image signal formed by the electronic pickup element to image data of a predetermined format.

Moreover, an external device 8 having a second wireless communication unit 9 is disposed outside the electronic pickup camera.

The electronic pickup element photoelectrically converts an object image to form an analog image signal. The image conversion unit digitalizes this analog image signal and converts the digital image signal into compressed image data of a predetermined format. An example of an electronic pickup element is a solid-state pickup element such as a CCD or a CMOS.

The display unit 3 displays the picked-up image based on the image data formed by the pickup unit 1, and operating information. For example, a liquid crystal element is adopted as the display unit 3. The storage unit 4 stores the image data formed by the pickup unit 1. For example, a non-volatile semiconductor memory is adopted as the storage unit 4. The non-volatile semiconductor memory may be fixed in the electronic pickup camera or may be detachably attached thereto.

A release switch, a power switch, a zoom switch and an image data automatic transmission setting switch are included in the input unit 5. When the release switch is depressed, an object image is picked up. When the power switch is turned on, the control unit 2 moves the lens of a pickup optical system located at a retracted position, forward to a wide-angle position, and starts to supply power from the power source 7 to each unit of the electronic pickup camera. When the power switch is turned off, the control unit 2 retracts the pickup optical system into the retracted position of the body of the electronic pickup camera, and partially or wholly stops the supply of power from the power source 7 to each unit of the electronic pickup camera. The image data automatic transmission setting switch is a switch which functions as a specifying unit for specifying whether the image data stored in the storage unit 4 is to be automatically transmitted to the external device 8 via the wireless communication unit 6.

The wireless communication unit 6 is an electronic circuit which transmits the image data stored in the storage unit 4 to the external device 8. The wireless communication unit 6 applies for example, an appropriate communication protocol to the image data, thereby forming data to be transmitted, and then transmits this data (e.g., wirelessly)

The power source 7 supplies power to the entire electronic pickup camera, and uses batteries having appropriate capacities and voltages. It is preferable to construct the electronic pickup camera so that it can also receive power supplied from an external power source. The power from the power source 7, even if the power switch is turned off, is continuously supplied to the control unit 2 and the wireless communication unit 6 at least while the image data is being transmitted.

The control unit 2 drives and controls the entire electronic pickup camera including the pickup unit 1, the display unit 3, the storage unit 4, the input unit 5, the wireless communication unit 6 and the power source 7. The control unit 2 is a programmed processing unit such as a CPU.

The electronic pickup camera is capable of wirelessly transmitting the image data stored in the storage unit 4 to the second wireless communication unit 9 of the external device 8 via the wireless communication unit 6. The method of wireless communication between the wireless communication unit 6 of the electronic pickup camera and the second wireless communication unit 9 of the external storage device 8 uses, for example, Bluetooth (registered trademark). Bluetooth (registered trademark) is a standard for short range wireless communication for providing connection among various digital devices such as cellular telephones, PDAs, notebook PCs, digital cameras and printers, and is set by a standardization group, Bluetooth SIG (Special Interest Group). In the present application, the term "Bluetooth" (registered trademark) is used not as a trademark but as a term which means a standard. Namely, in the present application, Bluetooth (registered trademark) means Bluetooth (registered trademark) which is the communication standard prescribed by Bluetooth SIG, as well as an improved, expanded and modified communication standard of Bluetooth (registered trademark).

Examples of the external device 8 are various PCs such as notebook PCs, PDAs, printers, cellular telephones and data servers. The second wireless communication unit 9 may be built in the external device 8, or the second wireless communication unit 9 may also be remote from the external device 8 with a data transmission path interposed therebetween. For example, a construction may be adopted in which a cellular telephone (the second wireless communication unit 9) disposed near the electronic pickup camera receives image data from the electronic pickup camera and the image data received by this cellular telephone is transmitted to a PC (the external device 8) at a remote location via a cellular telephone network.

Of course, a communication method that may be used in accordance with the invention (i.e., the method of communication between the wireless communication unit 6 on the electronic pickup camera side and the second wireless communication unit 9) is not limited to Bluetooth. Other wired or wireless communication methods are usable. For example, file transfer using LANs (such as ftp) may be used.

Figure 2:
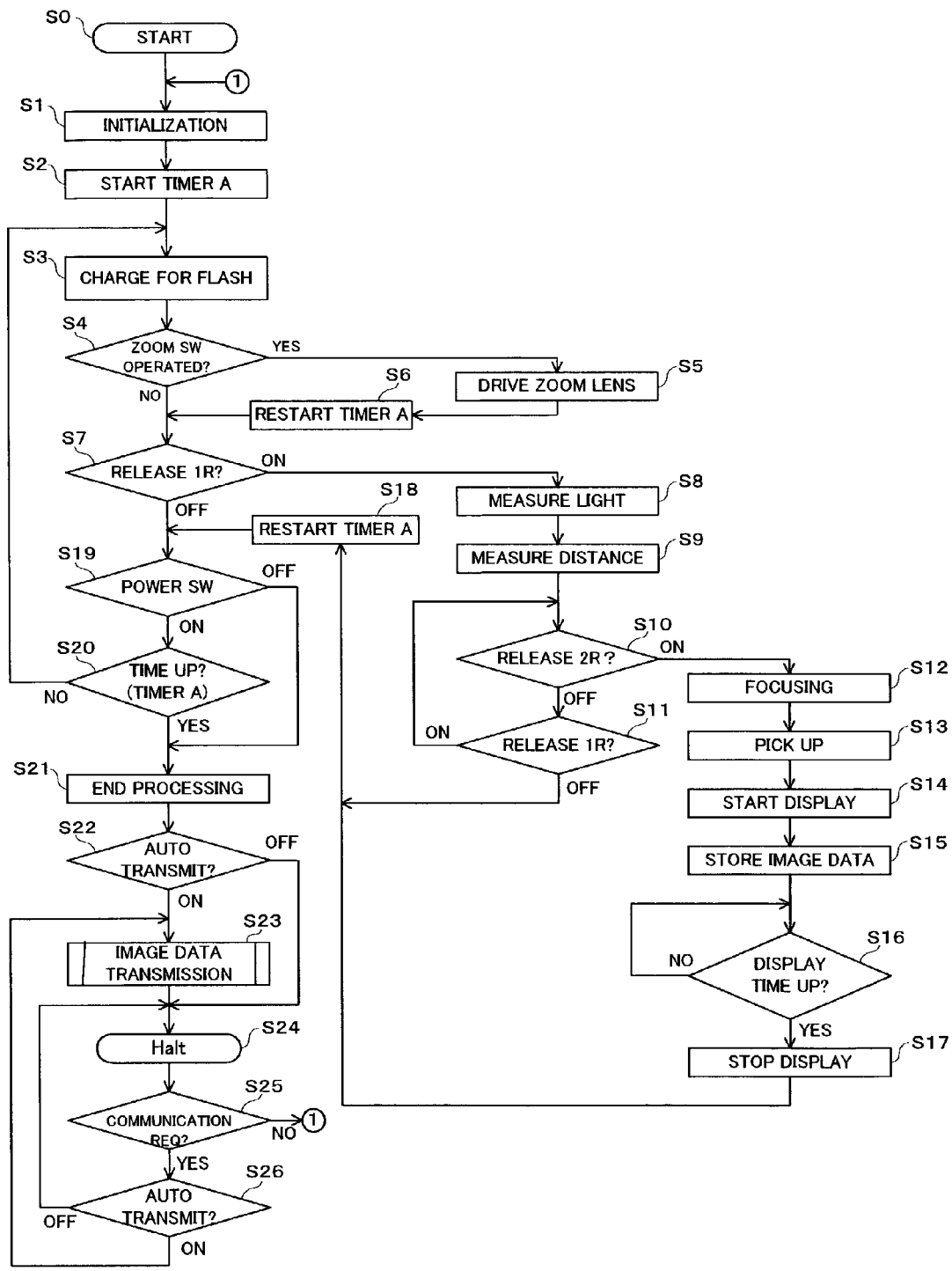
FIG. 2 is a flowchart illustrating an image pickup operation and an image storage operation in an embodiment of an electronic pickup camera according to the invention.

FIG. 2 is a view illustrating the manner in which the control unit 2 in the electronic pickup camera controls a pickup exposure operation and a recording operation of picked-up image data.

When the power switch (not shown) of the input unit 5 is turned on by an operator, power from the power source 7 is supplied to the control unit 2, the pickup unit 1, the display unit 3 and the wireless communication unit 6, and the control unit 2 starts initialization (Step S1). In the initialization, the control unit 2 drives and controls the pickup optical system to move forward from the retracted position where the pickup optical system is accommodated in the body of the electronic pickup camera, to the wide-angle end position where the pickup optical system can pick up an image, thereby bringing the electronic pickup camera into a pickup-enabled state.

When the initialization of Step S1 is completed, the control unit 2 starts a built-in timer A (not shown) to initiate the measurement of elapsed time (Step S2). The timer A measures the time for which the input unit 5 is not being operated. When an operation of the input unit 5 occurs, the timer A is reset once, and again measures the elapsed time from the point of time of resetting the timer A.

When the timer A starts in Step S2, the control unit 2 checks the amount of charge in a power capacitor for flash emission (not shown). If the amount of charge in the charge capacitor does not satisfy a predetermined amount, the control unit 2 performs a charging operation (Step S3).

Then, the control unit 2 determines whether a zoom switch (not shown) provided in the input unit 5 has been operated to instruct the pickup optical system to zoom in or zoom out (Step S4).

If in Step S4 the control unit 2 determines that the pickup optical system has been instructed to zoom in or zoom out, the control unit 2 drives and controls a zoom driving function (not shown) to cause the pickup optical system to zoom in or zoom out (Step S5). If the pickup optical system is instructed to zoom in, the control unit 2 drives the zoom driving function to move the pickup optical system forward, from the wide-angle end side to the telephoto end side. If the pickup optical system is instructed to zoom out, the control unit 2 drives the zoom driving function to move the pickup optical system backward, from the telephoto end side toward the wide-angle end side.

Then, the control unit 2 restarts the timer A in Step S6. This restarting may also be executed before Step S5. Then, the control unit 2 executes Step S7. In Step S7, the control unit 2 determines whether the release switch of the input unit 5 has been turned on.

The release switch is a switch which is operated in two steps. First, when the release switch is brought to a half depressed state, a first release switch 1R is turned on to measure the object distance and the object brightness. Then, when the release switch is brought to a fully depressed state, a second release switch 2R is turned on. When the second release switch 2R is turned on, the focus of the pickup optical system is adjusted based on the measured result of the object distance, and the aperture value of the pickup optical system and the electronic shutter time of the pickup element of the pickup unit 1 are set based on the measured result of the object brightness, to pick up an object image.

An operation associated with this release switch will be described later in Steps S8 to S18.

If the control unit 2 determines in Step S7 that the first release switch IR has been turned on, the control unit 2 drives a light measuring function (not shown) to measure the object brightness (Step S8). The light measuring function uses a publicly known light measuring method. For example, there is a method of computing a brightness value from an object image signal photoelectrically converted by the pickup element of the pickup unit 1 or a method of computing a object brightness value from a photoelectric current occurring due to object light incident on a light measuring element.

Then, the control unit 2 drives a publicly known distance measuring function for measuring the distance to an object (not shown) to measure the distance to the object (Step S9). An example of the publicly known distance measuring function is a triangulation method.

This triangulation method has a passive method, an active method, and a hybrid method in which the passive method and the active method are combined. The passive method divides light coming from an object into separate lights, receives the respective lights at a pair of light sensors, compares the outputs of the line sensors with each other, and measures the distance to the object. The passive method may also use an auxiliary light source such as a flash unit for emitting illuminating light toward an object when the brightness and the contrast of the object are low.

The active method measures the distance to an object by using an infrared light emitting element for projecting an infrared beam onto the object, and a position detecting element which is disposed away from the infrared light emitting element by a predetermined base line length and receives an infrared beam reflected from the object.

When the distance measurement of Step S9 is completed, the control unit 2 determines whether the second release switch 2R has been turned on (Step S10). If the second release switch 2R is turned off, the control unit 2 determines whether the first release switch 1R has been turned on (Step S11). If the first release switch 1R is also turned off in Step S11, the control unit 2 proceeds the processing of Step S18 without picking up an image. On the other hand, if the first release switch 1R is still on in Step S11, the control unit 2 returns to Step S10 and again determines whether the second release switch 2R is on.

If the control unit 2 determines in Step S10 that the second release switch 2R has been turned on, the control unit 2 drives a focus adjusting function of the pickup optical system (not shown) to adjust the pickup optical system to a focus position, by using the distance value measured in Step S9 (Step S12).

Then, the control unit 2 drives the pickup unit 1 to pick up an image of the object (Step S13). Namely, the control unit 2 determines the aperture value of the pickup optical system and the exposure time of the pickup element of the pickup unit 1, by using the measured light value obtained in Step S8. The control unit 2 drives the aperture stop of the pickup optical system according to the determined aperture value. Then, the control unit 2 drives an electronic shutter according to the determined exposure time to expose the pickup element to an object image. This object image to which the pickup element is exposed is photoelectrically converted by the pickup element, whereby an analog image signal is formed.

If it is determined from the result of the light measurement of Step S8 that the object is dark, a flash unit may be activated to illuminate the object. The analog image signal is converted to a digital signal and then converted into predetermined compressed digital data, by the image conversion unit. Examples of the format of the compressed digital image data are the JPEG format and the TIFF format.

When the pickup process is completed, the control unit 2 converts the compressed digital image data formed by the pickup unit 1, as required, and supplies the image data to the display unit 3 to display the picked-up image (Step S14).

When the picked-up object image is displayed on the display unit 3, the control unit 2 starts a built-in timer B to start measuring the length of time the image is displayed on the display unit 3.

Then, the control unit 2 stores the compressed digital image data formed by the pickup unit 1 into the storage unit 4 (Step S15). When the image data are stored in the storage unit 4, the address data of the storage unit 4 at which the image data are stored and attribute data for specifying whether the deletion of the stored image data is possible are stored together.

When the storage of the image data into the storage unit 4 is complete, the control unit 2 determines the elapsed time of the timer B which was started when the picked-up image was displayed on the display unit 3 in Step S14 (Step S16). If in Step S16 the display time of the picked-up image on the display unit 3 elapses a predetermined time, the control unit 2 stops the display of the picked-up image on the display unit 3 (Step S17). If in Step S16 the predetermined time has not yet elapsed, Step S16 is repeated until the predetermined time elapses.

As described above, when it is determined in Step S7 that the first release switch is turned on and it is determined in Step S10 that the second release switch is turned on, the object image is picked up, and the image data are stored in the storage unit 4. In addition, the picked-up image is displayed on the display unit 3 for a predetermined time. The object image is not displayed in any other case. After that, the control unit 2 restarts the timer A (Step S18) and proceeds to Step S19.

In Step S19, similar to the initialization of Step S1, the control unit 2 determines whether the power switch is in its on state. If the on state of the power switch is confirmed, the control unit 2 determines whether a preset predetermined time has elapsed since the timer A started in Step S2 (Step S20). If the predetermined time has not elapsed, the control unit 2 returns to Step S3 and again executes the charge check of the flash unit and the following steps, and continues to maintain the state in which an object image can be picked up.

On the other hand, if it is determined in Step S19 that the power switch is off or it is determined in Step S20 that the preset predetermined time has elapsed from the start of the timer A, the control unit 2 performs the end processing of the electronic pickup camera (Step S21).

In this end processing, the pickup optical system is moved backward to the retracted position. The control unit 2 continues the supply of power from the power source 7 to the storage unit 4 and the wireless communication unit 6, but stops the supply of power from the power source 7 to the pickup unit 1 and the display unit 3.

When the end processing is completed, the control unit 2 makes a decision as to the on/off state of the image data automatic transmission setting switch provided in the input unit 5 (Step S22). The image data automatic transmission setting switch is a switch for setting whether the image data stored in the storage unit 4 is to be automatically transmitted to the external device 8.

If the automatic transmission setting switch is on, the control unit 2 performs automatic transmission of the image data. Specifically, the control unit 2 reads out the image data stored in the storage unit 4, and drives and controls the wireless communication unit 6 to communicate wirelessly with the second wireless communication unit 9 of the external device 8 and perform transmission of the image data (Step S23). Details of the transmission operation of the image data will be described later with reference to FIG. 3.

If it is determined in Step S22 that the automatic transmission setting switch is off (in this case, the automatic transmission of the image data is not performed) or if the automatic transmission of the image data in Step S23 is completed, the control unit 2 brings the electronic pickup camera to a halt state (Step S24).

The halt state is a power saving state and a standby state. In this halt state, many functions including the pickup function of the electronic pickup camera are halted, but the wireless communication unit 6 is able to receive an image data communication request signal from the second wireless communication unit 9. The halt state comes to an end when, during the halt state, the second wireless communication unit 9 transmits an image data communication request signal and the first wireless communication unit 6 receives the image data communication request signal and the received information is transmitted to the control unit 2. In addition, when the power switch is turned on, the halt state comes to an end.

When the halt state comes to an end, the control unit 2 determines whether the wireless communication unit 6 has received an image data communication request signal from the second wireless communication unit 9 (Step S25).

If the control unit 2 determines that the image data communication request signal has been received, the control unit 2 determines whether the automatic transmission setting switch of the input unit 5 is on (Step S26). If the control unit 2 determines that the automatic transmission setting switch is on, the control unit 2 returns to Step S23 to execute an image data transmission operation (Step S23). If the control unit 2 determines that the automatic transmission setting switch is off (i.e., automatic transmission is disabled), the control unit 2 returns to Step S24 and again enters the halt state.

If the control unit 2 determines in Step S25 that an image data communication request signal has not been received, the control unit 2 transfers control to Step S1.

Thus, in this embodiment, the electronic pickup camera is started by the power switch, and the image data formed by the pickup unit 1 through the pickup operation of Steps S1 to S18 are stored in the storage unit 4. When the power switch of the electronic pickup camera is turned off, or when the electronic pickup camera is not operated for a predetermined time or more, the image data are automatically transmitted to the external device 8 (however, only if the image data communication request signal is set to be on). This transmission is also enabled by an image data transmission request from the external device 8.

A detailed operation of the image data transmission of Step S23 will be described with reference to FIG. 3.

In this embodiment, Bluetooth (registered trademark) may be used as the communication standard for the wireless communication unit 6 and the second wireless communication unit 9. Using Bluetooth (registered trademark) enables both units to become a master or a slave. Specifically, when the wireless communication unit 6 receives a communication request from the second wireless communication unit 9, the wireless communication unit 6 is set to be a slave and the second wireless communication unit 9 is set to be a master. Conversely, when the wireless communication unit 6 does not receive a communication request from the second wireless communication unit 9 and receives a response to a communication request sent by the wireless communication unit 6 from the second wireless communication unit 9, the wireless communication unit 6 is set to be a master and the second wireless communication unit 9 is set to be slave.

The control unit 2 checks whether untransmitted image data are stored in the storage unit 4 (Step S30). If it is determined that there is no untransmitted image data, the control unit 2 returns to execute the halt processing of Step S24 of FIG. 2 and the following steps.

If it is determined that there are untransmitted image data, the control unit 2 determines whether the wireless communication unit 6 has received an image data communication request signal from the second wireless communication unit 9 of the external device 8 (Step S31).

If the control unit 2 determines in Step S31 that the wireless communication unit 6 has not received an image data communication request signal from the second wireless communication unit 9, the control unit 2 sets the wireless communication unit 6 as the master and prepares to transmit the image data stored in the storage unit 4 to the external device 8 via the second wireless communication unit 9 (Step S32). Then, the control unit 2 drives the wireless communication unit 6 to send a communication request to the second wireless communication unit 9 for starting wireless communication (Step S33).

Then, the control unit 2 detects a response to the communication request that the control unit 2 has sent in Step S33 (Step S34). This response is outputted from the external device 8 via the second wireless communication unit 9 as a reply to the communication request. When the image data communication request signal from the wireless communication unit 6 is received by the second wireless communication unit 9, the external device 8 determines whether image data transmission corresponding to this image data communication request signal is acceptable. If the control unit of the external device determines that image data is acceptable, the second wireless communication unit 9 outputs an image data acceptance response signal to the wireless communication unit 6.

If the control unit 2 determines in Step S34 that there is no image data acceptance response from the external device 8, the control unit 2 returns to execute Step S24 of FIG. 2 and the following steps.

In this embodiment, the sending of the image data communication request from the electronic pickup camera is performed only once, but it may be periodically tried over a plurality of times until a response signal is detected.

On the other hand, if there is an image data acceptance response, a link is established between the wireless communication unit 6 and the second wireless communication unit 9 to execute Step S36 and the following steps.

Referring back to Step S31, if the control unit 2 determines that the first wireless communication unit 6 has received an image data communication request signal from the second wireless communication unit 9, the control unit 2 sets the first wireless communication unit 6 as a slave and prepares to transmit the image data stored in the storage unit 4 to the external device 8 via the second wireless communication unit 9 according to the request of the external device 8 (Step S35).

Then, a link is established between the wireless communication unit 6 and the second wireless communication unit 9 to execute Step S36 and the following steps.

When the wireless communication unit 6 and the second wireless communication unit 9 become a master and a slave and vice versa, Step S36 is executed. In Step S36, the control unit 2 reads out the untransmitted image stored in the storage unit 4. Then, the control unit 2 drives and controls the first wireless communication unit 6 to wirelessly transmit the untransmitted image data to the second wireless communication unit 9 as a wireless signal having Bluetooth (registered trademark) specifications.

When the transmission is completed, the control unit 2 determines whether the wireless communication transmission has a communication error (Step S37). The detection of a communication error is performed by a communication state monitoring circuit (not shown) which is an error detecting unit included in the wireless communication unit 6. This communication state monitoring circuit monitors the state of communication, and detects timeouts and parity errors. If a communication error is detected, the control unit 2 drives and controls the first wireless communication unit 6 to retransmit image data affected by the communication error (Step S39).

Then, the control unit 2 again determines whether there is a communication error in the image data retransmitted in Step S39 (Step S40). If it is again determined in Step S40 that there is a communication error, the control unit 2 sets the image data affected by the communication error to be undeletable from the storage unit 4, and displays on the display unit 3 a warning indicating that the image data is undeletable (Step S41).

If it is determined in Step S37 or S40 that there is no communication error, then the transmission of the image data was successful and the control unit 2 therefore clears the undeletable setting and the undeletable warning display setting from the image data stored in the storage unit 4 (Step S38).

Then, the control unit 2 determines whether automatic deletion is possible for each image data stored in the storage unit 4 (Step S42). The decision as to the automatic deletion is made according to whether an attribute of the image data is set to be undeletable or not. Then, the control unit 2 determines whether the external device 8 is a predetermined external storage device (Step S43). Exemplary ways to effect Step S43 will be described below with reference to FIGS. 4 and 5.

Figure 3:
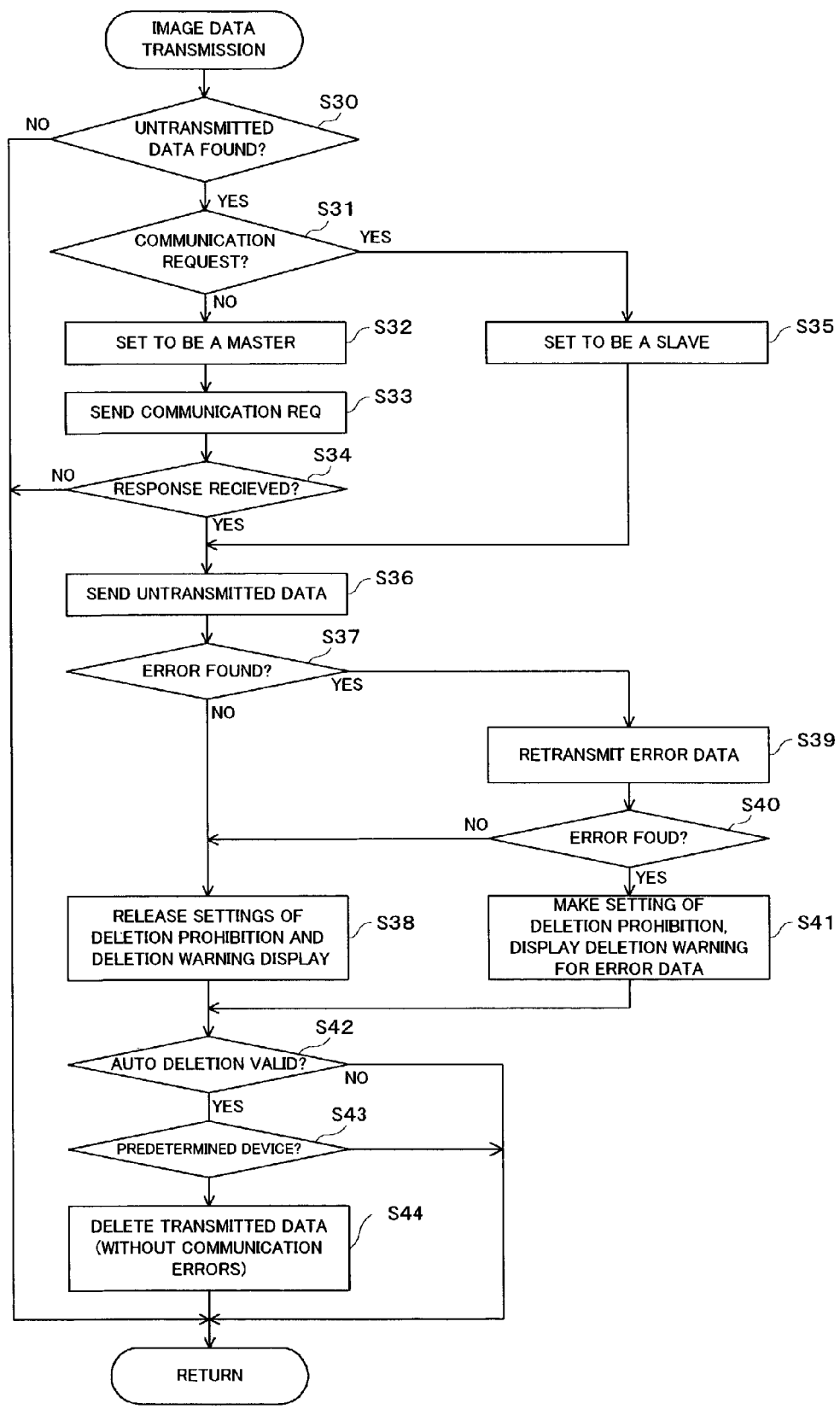
FIG. 3 is a flowchart illustrating an electronic image data transmission operation in an embodiment of an electronic pickup camera according to the invention.
Figure 4:
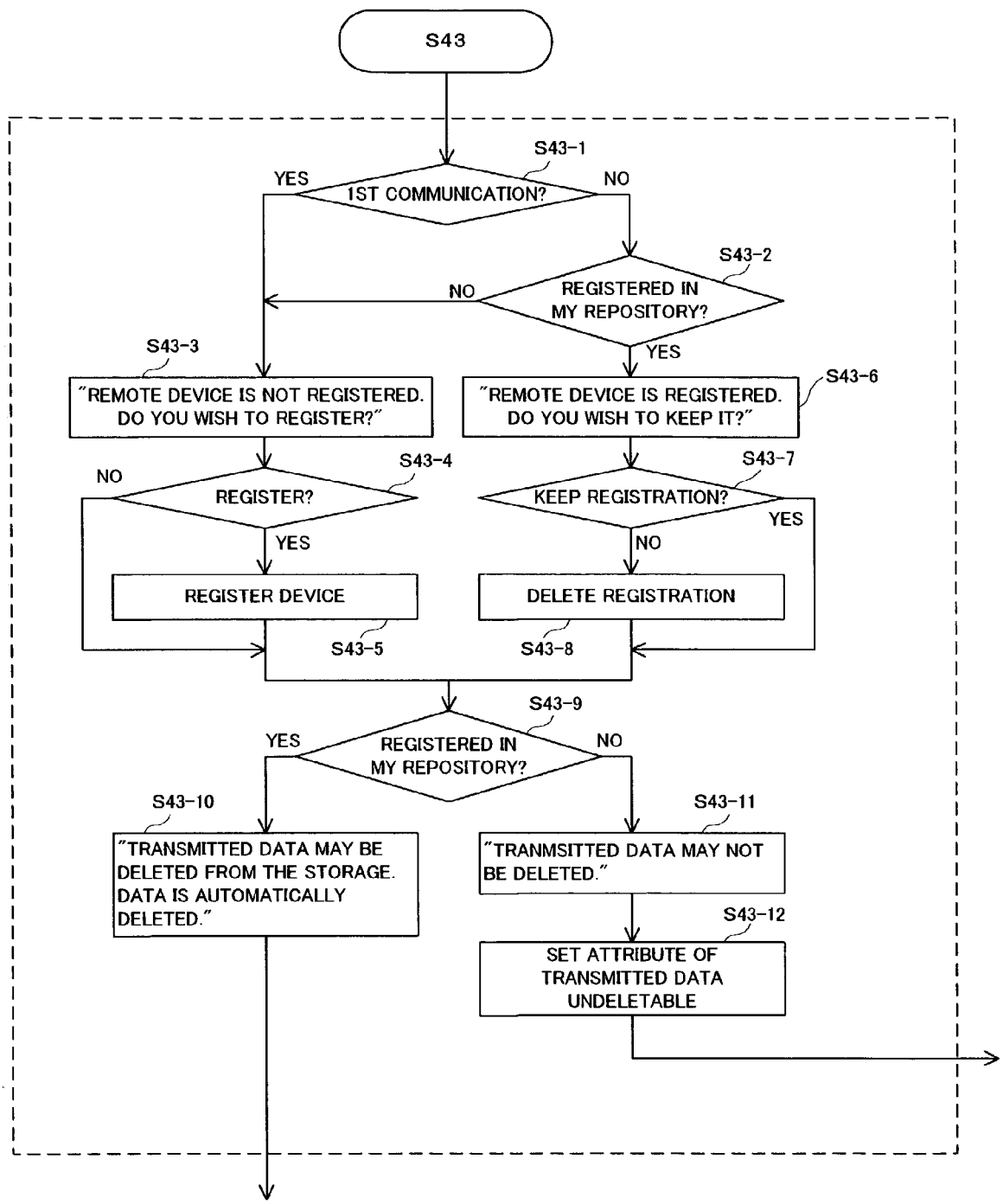
FIG. 4 is a flowchart illustrating in detail a first example of the contents of Step S43 in FIG. 3.

FIG. 4 is a flowchart illustrating in detail a first exemplary way to effect Step S43. In this first example, the names of external devices are registered in a list on a storage medium of the electronic pickup camera (the storage medium may be the same as or different from the storage unit 4), and if the external device 8 which is a device to which the image data are transmitted satisfies a condition, that is the external device 8 is on the list, the control unit 2 determines that the external device 8 is a predetermined external device. In this example, it is preferable that the names of the devices to be used for storing the image data (like a PC in the operator's house) are registered on the list. For this reason, the list is named "my repository". If the external device 8 to which the image data are transmitted is registered on my repository, the transmitted image data will be deleted from the storage unit 4 in Step S44 of FIG. 3, described later, upon a successful transmission. If the external device 8 is not registered on my repository, no image data are deleted. In this manner, the control unit 2 determines whether the external device 8 is a predetermined external device, and selects an accompanying process, if any, of the transmission process.

In the first example, a link key is used for the identification of the external device 8. The link key is a key used for mutual authentication in wireless transmission based on Bluetooth standards. The link key is a 128-bit common key which Bluetooth devices generate when they are connected for the first time. In the subsequent communications, both Bluetooth devices authenticate each other on the basis that a remote device at the other end has the same link key.

First, the control unit 2 determines whether the external device 8 is a remote device with which the electronic pickup camera is to communicate for the first time (Step S43-1). This decision is made according to whether the electronic pickup camera and the external device 8 have the same link key. If the electronic pickup camera and the external device 8 do not have the same link key, it is the first time that the electronic pickup camera and the external device 8 are communicating with each other, and Step S43-3 is executed. If the electronic pickup camera has the same link key as the external device 8, this indicates that the electronic pickup camera and the external device 8 had previously communicated with each other, and Step S43-2 is executed.

In Step S43-2, the control unit 2 determines whether the external device 8 is registered on my repository list stored on the storage medium of the electronic pickup camera. If the external device 8 is not registered on my repository, Step S43-3 is executed, and if the external device 8 is registered on my repository, Step S43-6 is executed.

The control unit 2 executes Step S43-3 when the external device 8 is not registered on my repository. The control unit 2 displays on the display unit 3 the message "This remote device is not registered on my repository. Do you wish to register it?". Then, the control unit 2 detects a response from the operator of the electronic pickup camera (Step S43-4). If the operator of the electronic pickup camera inputs an affirmative response through the input unit 5, the control unit 2 registers the link key to be shared by the external device 8 in my repository (Step S43-5). If the operator of the electronic pickup camera inputs a negative response through the input unit 5, or if the operator does not respond within 3 seconds, the registration is not performed.

The control unit 2 executes Step S43-6 when the external device 8 is registered in my repository. The control unit 2 displays on the display unit 3 the message "This remote device is registered in my repository. Do you wish to keep the registration?". Then, the control unit 2 detects a response from the operator of the electronic pickup camera (Step S43-7). If the operator of the electronic pickup camera inputs a negative response through the input unit 5, the control unit 2 deletes a link key shared by the external device 8 from my repository (Step S43-8). If the operator of the electronic pickup camera inputs an affirmative response through the input unit 5, or if the operator does not respond within 3 seconds, the deletion is not performed.

As described above, Step S43-6 and Step S43-7 are steps in which the control unit 2 informs the operator of the electronic pickup camera of the registered contents on my repository and gives the operator an opportunity for maintenance of my repository.

After the operator of the electronic pickup camera has been given an opportunity for maintenance of my repository, the control unit 2 executes Step S43-9. In Step S43-9, the control unit 2 determines whether the external device 8 is a predetermined external device. In this first example, the control unit 2 determines that the external device 8 is a predetermined external device when it is registered on my repository list.

If the external device 8 is registered in my repository, the control unit 2 displays on the display unit 3 the message "The transmitted image data may be deleted from the storage medium. The image data is automatically deleted." (Step S43-10). After that, the control unit 2 proceeds to Step S44 of FIG. 3, and deletes the transmitted image files from the storage unit 4. Of course, the deletion-of the image file may be executed manually instead of automatically.

If the external device 8 is not registered in my repository, the control unit 2 displays on the display unit 3 the message "The transmitted image data may not be deleted from the storage medium." (Step S43-11). After that, the control unit 2 sets an undeletable attribute on the transmitted image file stored in the storage medium 4 (Step S43-12).

In the first example, the external device 8 is identified by the use of a link key of Bluetooth standards, but a Bluetooth address may also be used instead of the link key. In the cases where transmission is not based on Bluetooth, but rather on LAN communication, the external device 8 can also be identified with a MAC address contained in the header of a packet.

A PC installed in the operator's house and a data archive server on the Internet are preferably registered on my repository.

Figure 5:
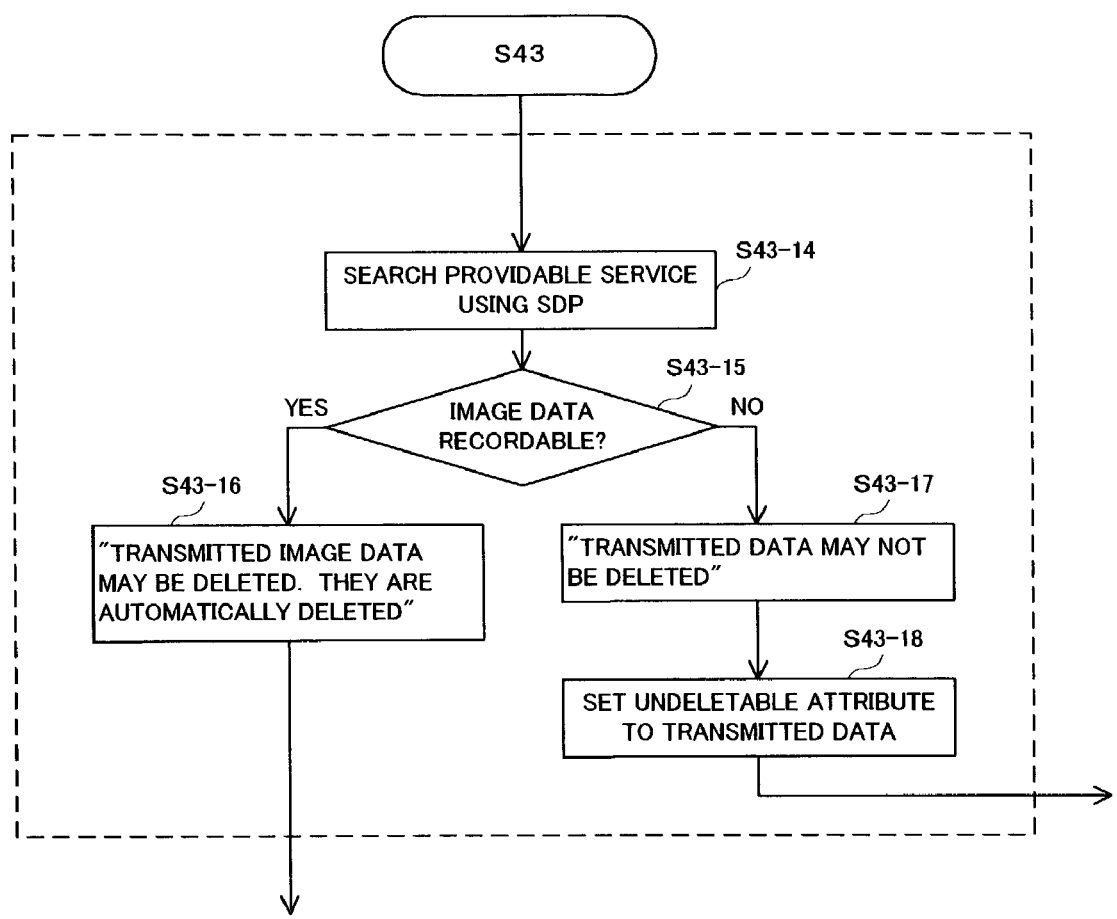
FIG. 5 is a flowchart illustrating in detail a second example of the contents of Step S43 in FIG. 3.

FIG. 5 is a flowchart illustrating in detail a second example of the contents of Step S43. In this second example, the external device 8, to which the image data are transmitted, is determined to be the predetermined device when the external device 8 is capable of providing a predetermined service. One preferred example of the predetermined service is the service of recording image data. In the following description, the service of recording received image data is adopted as an example of the predetermined service.

First of all, the control unit 2 searches for services which can be provided by the external device 8, using the SDP (Service Discovery Protocol) of Bluetooth standards (Step S43-14). The SDP is a protocol for searching for services provided by a remote connected device. Then, on the basis of the result of the SDP search, the control unit 2 determines whether the external device 8 provides the service of recording the received image data (Step S43-15).

If the external device 8 provides the service of recording the received image data, the control unit 2 displays on the display unit 3 the message "The transmitted image file may be deleted from the storage medium. The image file will be automatically deleted." (Step S43-16). After that, the control unit 2 proceeds to Step S44 of FIG. 3, and deletes the transmitted image file from the storage unit 4. Of course, the deletion of the image file may be executed in a manual operation by the operator instead of automatically.

If the external device 8 does not provide the service, the control unit 2 displays on the display unit 3 the message "The transmitted image file may not be deleted from the storage medium." (Step S43-17). Then, the control unit 2 sets an undeletable attribute of the transmitted image file stored in the storage medium (Step S43-18).

The processing examples of Step S43 of FIG. 3 have been described above with reference to FIGS. 4 and 5. However, the contents of Step S43 are not limited to these examples.

Referring back to FIG. 3, if the external device 8, which is the remote device to which to transmit the image data, conforms to the condition in Step S43, the control unit 2 determines that the external device 8 is a predetermined external device, and deletes the transmitted image data from the storage unit 4 (Step S44). In this case, since the attribute of the image data, affected by a communication error, is set to be undeletable, the image data of the communication error are not deleted. Then, the control unit 2 returns.

Referring back to step S43, if the external device 8 which is the remote device, to which the image data are transmitted, does not conform to the condition in Step S43, the control unit 2 returns.

Incidentally, during the deletion, directory information may only be deleted, or the image data itself may be deleted. In addition, in the case where all the image data stored in the storage unit 4 are to be deleted, the storage unit 4 may be formatted.

After the return of the control unit 2, the halt processing of Step S24 of FIG. 2 and the following steps are executed.

Thus, in the electronic pickup camera of this embodiment, in the case where the image data stored in the storage unit 4 is transmitted to the external device 8, if the external device 8 is registered in my repository or provides the service of recording image data, the transmitted image is automatically deleted from the storage unit 4. Consequently, even if the remaining capacity of the storage unit 4 becomes small, the operator of the electronic pickup camera can cope with the shortage of the capacity only by transmitting the image data stored in the storage unit 4 to the predetermined external device. It is possible therefore to reduce the possibility that image data that should not be deleted from the storage unit 4 may be deleted by a misunderstanding or a mistaken operation by the operator.

Of course, the electronic pickup camera may also be set to overwrite the attributes of transmitted image data without deleting the transmitted image data. According to this construction, even after an image is transmitted, the image data can be displayed on the display unit 3 or transmitted to another external device, since the transmitted image is not deleted. Since this image data can be overwritten, it does not impede storing new image data in the storage unit 4.

The invention can be applied to various processes which accompany the transmission process, in addition to the processing relating to the deletion of transmitted image data. Examples of such processes which can accompany a transmission processing are transmission of an e-mail and creation of transmission log data.

What is claimed is:

1. An electronic pickup camera comprising:
    an electronic pickup element which photoelectrically converts an object image to form an image signal;
    an image conversion unit which converts the image signal formed by the electronic pickup element to image data of a predetermined format;
    a storage unit which stores the image data converted by the image conversion unit;
    a transmission unit which enables transmission of the image data stored in the storage unit to an external device; and
    a control unit which decides whether an external device, to which the transmission unit transmits the image data, is a predetermined external device, and selects an accompanying process for transmission of the image data based on the result of the decision,
    wherein when the external device to which the transmission unit transmits the image data is the predetermined external device, the accompanying process selected by the control unit includes a process of deleting the transmitted image data from the storage unit, and
    wherein when the external device to which the transmission unit transmits the image data is not the predetermined external device, the accompanying process selected by the control unit includes a process of setting an undeletable attribution to the transmitted image data stored in the storage unit.

2. The electronic pickup camera according to claim 1, wherein the accompanying processes selected by the control unit includes a process of deleting the transmitted image data from the storage unit only if the transmission or the image data by the transmission unit succeeds.

3. The electronic pickup camera according to claim 1, further comprising a display unit,
    wherein when the external device to which the transmission unit transmits the image data is the predetermined external device, the accompanying process selected by the control unit includes a process of displaying, on the display unit, information indicating that the transmitted image data may be deleted from the storage unit.

4. The electronic pickup camera according to claim 1, further comprising a display unit,
    wherein when the external device to which the transmission unit transmits the image data is not the predetermined external device, the accompanying process selected by the control unit includes a process of displaying information, on the display unit, indicating that the transmitted image data may not be deleted from the storage unit.

5. The electronic pickup camera according to claim 1, further comprising a storage medium in which information for identifying an external device is stored,
    wherein, the control unit determines that an external device identified by the information stored in the storage medium is the predetermined external device.

6. The electronic pickup camera according to claim 5, wherein the information for identifying an external device, which is stored in the storage medium, is stored in list form.

7. The electronic pickup camera according to claim 5, wherein the transmission unit wirelessly transmits the image data in accordance with Bluetooth standards,
    the control unit recognizes the external device by using a link key adopted in Bluetooth standards.

8. An electronic pickup camera comprising:
    an electronic pickup element which photoelectrically converts an object image to form an image signal;
    an image conversion unit which converts the image signal formed by the electronic pickup element to image data of a predetermined format;
    a storage unit which stores the image data converted by the image conversion unit;
    a transmission unit which enables transmission of the image data stored in the storage unit to an external device; and
    a control unit which decides whether an external device, to which the transmission unit transmits the image data, is a predetermined external device, and selects an accompanying process for transmission of the image data based on the result of the decision,
    wherein the control unit determines whether the external device to which the transmission unit transmits the image data is the predetermined external device, on the basis of a service capable of being provided by the external device.

9. The electronic pickup camera according to claim 8, wherein when the external device to which the transmission unit transmits the image data is capable of providing a service of storing image data, the control unit determines that the external device is the predetermined external device.

10. The electronic pickup camera according to claim 8, wherein the transmission unit wirelessly transmits the image data in accordance with Bluetooth standards, the control unit searches for the service capable being provided by the external unit, by using a Service Discovery Protocol adopted in Bluetooth standards.

11. An electronic pickup camera comprising:

an electronic pickup element which photoelectrically converts an object image to form an image signal;

an image conversion unit which converts the image signal formed by the electronic pickup element to image data of a predetermined format;

a storage unit which stores the image data converted by the image conversion unit;

a transmission unit which enables transmission of the image data stored in the storage unit to an external device;

a control unit which decides whether an external device, to which the transmission unit transmits the image data, is a predetermined external device, and selects an accompanying process for transmission of the image data based on the result of the decision; and a display unit, wherein when the external device to which the transmission unit transmits the image data is not the predetermined external device, the accompanying process selected by the control unit includes a process of displaying information, on the display unit, indicating that the transmitted image data may not be deleted from the storage unit.

12. An electronic pickup camera comprising:

an electronic pickup element which photoelectrically converts an object image to form an image signal;

an image conversion unit which converts the image signal formed by the electronic pickup element to image data of a predetermined format;

a storage unit which stores the image data converted by the image conversion unit;

a transmission unit which enables transmission of the image data stored in the storage unit to an external device;

a control unit which decides whether an external device, to which the transmission unit transmits the image data, is a predetermined external device, and selects an accompanying process for transmission of the image data based on the result of the decision; and a storage medium in which information for identifying an external device is stored, wherein, the control unit determines that an external device identified by the information stored in the storage medium is the predetermined external device, wherein the transmission unit wirelessly transmits the image data in accordance with Bluetooth standards, and wherein the control unit recognizes the external device by using a link key adopted in Bluetooth standards.

13. A control method for an electronic pickup camera comprising:

photoelectrically converting an object image and forming an image signal;

converting the image signal to image data of a predetermined format;

storing the image data in a storage unit;

enabling transmission of the image data stored to an external device; and determining whether an external device to which the image data is transmitted is a predetermined external device; and selecting an accompanying process of the transmission, on the basis of the determination, wherein if the external device is determined to be the predetermined external device, the accompanying process selected includes deleting the transmitted image data from a storage unit, and wherein if the external device is determined not to be the predetermined external device, the accompanying process selected includes setting an undeletable attribute to the transmitted image data stored in the storage unit.

14. The control method for an electronic pickup camera according to claim 13, wherein only when the transmission of the image data in the transmission step succeeds, the accompanying process selected includes a process of deleting the transmitted image data from the storage unit.

15. The control method for an electronic pickup camera according to claim 13, wherein if it is determined that the external device is the predetermined external device, the accompanying process selected includes displaying, on a display unit, information indicating that the transmitted image data may be deleted from the storage unit.

16. The control method for an electronic pickup camera according to claim 13, wherein if it is determined that the external device is not the predetermined external device, the accompanying process selected includes a process of displaying, on a display unit, information indicating that the transmitted image data may not be deleted from the storage unit.

17. The control method for an electronic pickup camera according to claim 13, wherein if the external device is registered in the electronic pickup camera, it is determined that the external device is the predetermined external device.

18. The control method for an electronic pickup camera according to claim 17, wherein the step of transmitting wirelessly transmits the image data in accordance with Bluetooth standards, and wherein, the external device is recognized with a link key adopted in Bluetooth standards.

19. A control method for an electronic pickup camera comprising:

photoelectrically converting an object image and forming an image signal;

converting the image signal to image data of a predetermined format;

storing the image data in a storage unit;

enabling transmission of the image data stored to an external device; and determining whether an external device to which the image data is transmitted is a predetermined external device; and selecting an accompanying process of the transmission, on the basis of the determination, wherein it is determined whether the external device is the predetermined external device, based on a service capable of being provided by the external device.

20. The control method for an electronic pickup camera according to claim 19, wherein when the external device is capable of providing a service of storing received image data, it is determined that the external device is the predetermined external device.

21. The control method for an electronic pickup camera according to claim 19, wherein the step of transmitting wirelessly transmits the image data in accordance with Bluetooth standards, and wherein the step of determining searches for the service capable being provided by the external unit, by a Service Discovery Protocol adopted in Bluetooth standards.

22. A control method for an electronic pickup camera comprising:

photoelectrically converting an object image and forming an image signal;

converting the image signal to image data of a predetermined format;

storing the image data in a storage unit;

enabling transmission of the image data stored to an external device; and determining whether an external device to which the image data is transmitted is a predetermined external device; and selecting an accompanying process of the transmission, on the basis of the determination, wherein if it is determined that the external device is not the predetermined external device, the accompanying process selected includes a process of displaying, on a display unit, information indicating that the transmitted image data may not be deleted from the storage unit.

23. A control method for an electronic pickup camera comprising:

photoelectrically converting an object image and forming an image signal;

converting the image signal to image data of a predetermined format;

storing the image data in a storage unit;

enabling transmission of the image data stored to an external device; and determining whether an external device to which the image data is transmitted is a predetermined external device; and selecting an accompanying process of the transmission, on the basis of the determination, wherein if the external device is registered in the electronic pickup camera, it is determined that the external device is the predetermined external device, wherein the step of transmitting wirelessly transmits the image data in accordance with Bluetooth standards, and wherein, the external device is recognized with a link key adopted in Bluetooth standards.

* * * * *